June 12, 1934.   C. H. REINERT ET AL   1,962,876

PEBBLE FINISHED METAL TUBING

Filed Aug. 14, 1933

Inventors
CHARLES H. REINERT
& KENNETH J. LAWRENCE
By Richey & Watts
Attorneys

Patented June 12, 1934

1,962,876

UNITED STATES PATENT OFFICE 1,962,876

PEBBLE FINISHED METAL TUBING

Charles H. Reinert and Kenneth J. Lawrence, Brooklyn, N. Y., assignors to Steel & Tubes, Inc., Cleveland, Ohio, a corporation of Ohio Application August 14, 1933, Serial No. 684,978

4 Claims. (Cl. 247—27)

This invention relates to conduits and more particularly to electrical sheathing or conduit which is adapted to surround and protect insulated wiring in various installations.

As is well understood by those skilled in the art, an electric conduit composed of different lengths connected together by T's and L's is often bent to best fit around various shaped surfaces so as to form a continuous sheathing or protective covering between the plurality of points which are to be connected by electric wires. After the electric conduit is secured in place by clamps, screws or the like, the insulated wires are pulled or pushed through the conduit, perhaps with the aid of a flexible metal fish tape or wire. Thereafter, the insulated wires are connected as desired and a very well protected, and permanent wiring installation is provided.

Electrical conduits have heretofore been made up in a number of forms including an extruded or seamless metal pipe or tubing which ordinarily has walls of sufficient thickness to render the conduit comparatively rigid. This conduit can nevertheless be bent as desired in order to adapt itself to best convey and protect the insulated wiring.

Another form of tubing which has been employed to some extent in conjunction with sheathing electric conduits is a non-rigid tubing made up from sheet metal which extends in a helical interlocked coil to form a flexible protective casing for the insulated wires.

However, recently welded tubing has been made up from flat strip which is passed through suitable rollers, and folders so as to form the flat strip into a tube after which the abutting edges of the tube are welded to form an air tight conduit. The welded tube is ordinarily made up of steel so that its wall thickness is somewhat less than that of extruded seamless tubing although the internal diameter in similar sizes is identical.

Considerable difficulty has long been experienced in pulling the maximum number of insulated electric wires through the long or tortuously bent conduits after they have been secured together and fastened in position. Much of this difficulty is believed due to the fact that the wires are covered with insulation which normally contains a rubber or tar base that tends to frictionally engage with the interior walls of the conduit. Welded conduits in particular have offered strong frictional resistance to the passage of wires therethrough. This may be caused by the fact that welded conduit is made up from flat rolled strip so that the interior walls of the conduit are very flat and smooth and thus contact between the wires and conduit substantially throughout the conduit length results. In the seamless tube the internal bore is somewhat rougher and the wires pull through more readily which is believed due to the fact that there is less surface contact between the conduit walls and the frictional surfaces of the wire.

The present invention provides an improved conduit and particularly a welded conduit which avoids and overcomes the difficulties discussed above as will be increasingly evident as the description proceeds.

Figure 1:
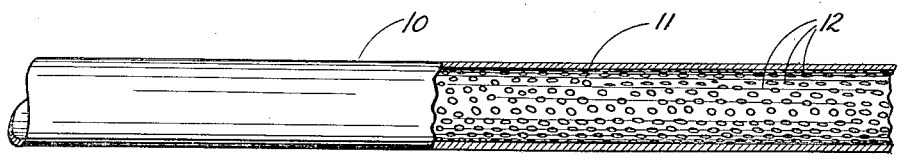
Figure 1 is a side elevation of a length of one embodiment of the improved conduit, a portion of the conduit wall being broken away to more clearly illustrate the invention.

Referring to the drawing the numeral 10 indicates generally a conduit made in accordance with the teachings of the present invention. The conduit is formed with an interior roughening 11 which is perhaps best described as pebbling. This surface preferably is formed with a plurality of raised projections 12 which are of slight height or radial length, have rounded end surfaces, may be arranged at random, and have end areas aggregating only a small percentage of the total area of the interior surface of the conduit. The end area of these projections 12 aggregate an area which is much less than the total area of the interior surface of the conduit if the latter were free from such projections. It will be apparent that the pebbling 11 can take a plurality of forms such as buttons, pebbles, squares, or rectangles.

Figure 2:
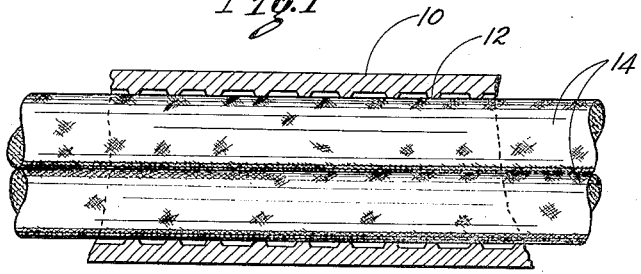
Figure 2 is an enlarged longitudinal sectional view of the conduit, shown in Figure 1, illustrating electric cables extending therethrough and in engagement with the conduit bore.

In Figure 2 is illustrated how the projections 12 on the conduit 10 function to reduce the contacting area by supporting insulated electric conduits 14, extending through the conduit, at a slight distance from the surface of the conduit. It is thus evident that the rough, rubbery or tarry insulation on the electric conductors 14 will not contact over its entire surface or length with the inner surface of the conduit which will, it is believed, cause less adhesion or frictional drag between the conduits and the cables.

Figure 3:
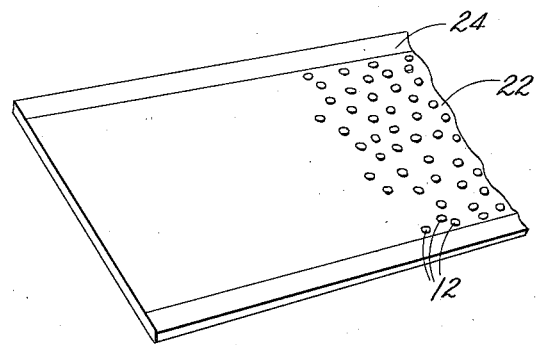
Figure 3 is a perspective view of a portion of the metal strip employed to make the welded conduit of Figures 1 and 2, shown prior to the folding and welding operation.
Figure 4:
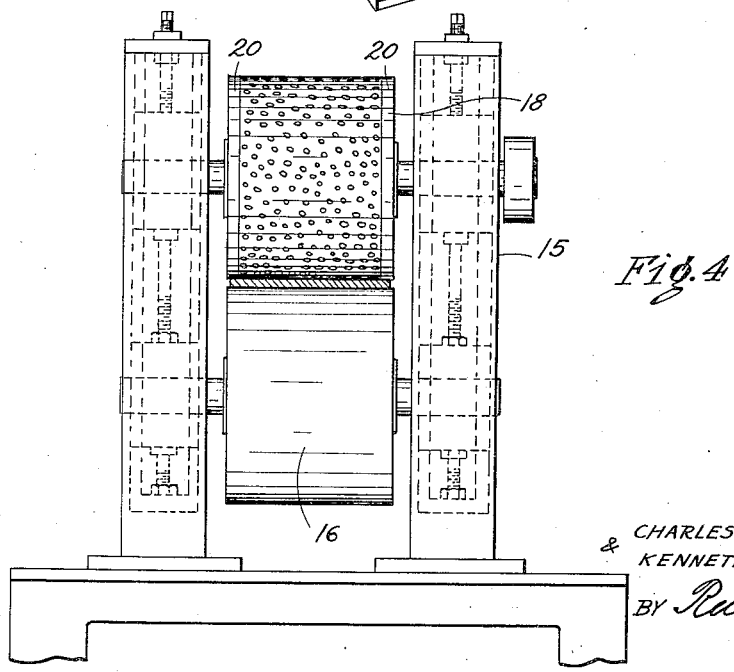
Figure 4 is a front elevation of apparatus which may be employed to produce the strip illustrated in Figure 3.

In the manufacture of standard welded tubing the strip to be welded is supplied to the tube forming and welding machine in long flat lengths which are approximately as wide as the tube is in circumference. In producing the pebbled conduit of the present invention the strip is passed, prior to the tube forming operation, through suitable mechanism 15, having rolls 16 and 18 which marks or pebbles one side of the strip as by imprinting a plurality of raised projections or buttons 12 upon the surface of the strip as shown in Figure 3.

This operation is ordinarily accomplished by providing one of the rolls, such as roll 18, with a plurality of indentations which may be formed with a punch, drill, or the like and thereafter passing the strip between the rolls so as to force a certain amount of the metal up into the shallow indentations of roll 18. The pressure between the rolls, preferably is not great enough to force the projections to completely fill the indentations upon the forming roll as this might cause sharp corners or edges on the projections formed.

It should also be noted that the forming roll 18 is preferably provided with unindented edges 20 which limit the production of pebbling to the central portion of the strip. As shown in Figure 3 the pebbled strip is indicated by the numeral 22, the smooth edges by the numeral 24 and the projections by the numeral 12. By providing the flat smooth portions 24 at the edges of the strip a longitudinal weld can be more readily and uniformly made when the pebbled strip is passed through standard tube forming and welding apparatus (not shown) to complete the manufacture of the tubing.

While the present invention is particularly adapted for use in conjunction with welded tubing, it will be apparent that the principles thereof can be applied to substantially any type of electric conduit or, for that matter, to metallic or nonmetallic conduit for housing or enclosing other material than electric conductors.

In accordance with the patent statutes the best known form of the invention has been completely illustrated and described, however, it will be understood that the scope of the invention is not limited thereto but is defined by the appended claims.

What we claim is:

1. A conduit, into which insulated wiring is to be passed, having an interior pebbled surface for reducing the area of contact between the insulated wiring and the conduit as compared with that of a conduit having a smooth inner surface.

2. A metal conduit, into which insulated wiring is to be passed, having an interior pebbled surface made up of inwardly extending projections of slight radial length and engageable with insulated wiring in the conduit over areas relatively small as compared with that of an unpebbled or smooth inner surface.

3. A metal conduit, into which insulated wiring is to be passed, said conduit having an interior pebbled surface made up of inwardly extending projections of slight radial length and having rounded inner ends of small area, said pebbled surface serving to reduce the area of contact and friction between the insulated wiring and the conduit.

4. A metal conduit, into which insulated wiring is to be passed, said conduit having an interior pebbled surface made up of inwardly extending projections arranged at random and each of said projections being of slight radial length and having a rounded inner end of small area.

CHARLES H. REINERT.
KENNETH J. LAWRENCE.